(12) United States Patent
Lajiness (10) Patent No.: US 11,492,140 B2
(45) Date of Patent: Nov. 8, 2022

(54) CAMERA MONITOR USING CLOSE PROXIMITY PRECISION INJECTION OF LIGHT

(71) Applicant: Rockwell Collins, Inc., Cedar Rapids, IA (US)

(72) Inventor: Gregory G. Lajiness, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 25 days.

(21) Appl. No.: 17/212,036

(22) Filed: Mar. 25, 2021

(65) Prior Publication Data

US 2022/0306318 A1 Sep. 29, 2022

(51) Int. Cl.
| B64D 47/08 | (2006.01) |
| G03B 15/00 | (2021.01) |
| B64D 47/00 | (2006.01) |
| B64D 45/00 | (2006.01) |

(52) U.S. Cl.
CPC ......... B64D 47/08 (2013.01); B64D 45/0053 (2019.08); G03B 15/006 (2013.01)

(58) Field of Classification Search
CPC ... B64D 47/08; B64D 45/0053; G03B 15/006
USPC ....................................................... 348/144
See application file for complete search history.

(56) References Cited

U.S. PATENT DOCUMENTS

| 7,355,179 | B1 | 4/2008 | Wood et al. |
| 8,193,478 | B2 | 6/2012 | Pak et al. |
| 8,275,213 | B2 | 9/2012 | Richardson |
| 8,547,456 | B1 | 10/2013 | Zimmerman et al. |
| 9,681,124 | B2 | 6/2017 | Moesle et al. |
| 10,109,054 | B1 | 10/2018 | Wilson et al. |
| 10,606,079 | B1 | 3/2020 | Keith |
| 2017/0359573 | A1 | 12/2017 | Kim et al. |
| 2018/0018759 | A1* | 1/2018 | Granot ...................... G06T 5/50 |

(Continued)

FOREIGN PATENT DOCUMENTS

| CN | 111683212 A | 9/2020 |
| KR | 1020160071386 A | 6/2016 |

OTHER PUBLICATIONS

U.S. Appl. No. 17/176,931, filed Feb. 15, 2021, Lajiness et al.
Extended Search Report in European Application No. 22164542.7 dated Jul. 21, 2022, 8 pages.

*Primary Examiner* — Susan E. Torgerson
(74) *Attorney, Agent, or Firm* — Suiter Swantz pc llo (57) ABSTRACT

An imaging system for an aircraft is disclosed. The imaging system comprises one or more image sensors configured to image a surrounding environment of the aircraft, a light source configured to emit light, a mask including one or more prisms configured to direct the light, and one or more pinholes configured pass the light directed from the one or more prisms, and a controller communicatively coupled to the one or more image sensors. The controller is configured to: receive an image of the surrounding environment of the aircraft from the one or more image sensors, wherein the image includes an artifact based on the light passed by the one or more pinholes; determine centroid data and extent data of the artifact in the image; and determine an orientation of the artifact in the image with respect to a calibration artifact using the centroid data and the extent data.

14 Claims, 10 Drawing Sheets

(56) References Cited

U.S. PATENT DOCUMENTS

2018/0157022 A1\* 6/2018 Lytle .................... G01N 21/274
2020/0259986 A1 8/2020 Moholt
2022/0076401 A1\* 3/2022 Gardiner ............... G06T 7/0002

\* cited by examiner

840nm, 1.2V, 20msec

| Threshold (DN) | X-Extent (pixels) | Y-Extent (pixels) | Centroid (X) | Centroid (Y) |
|---|---|---|---|---|
| 80 | 57 | 46 | 3038 | 1729 |
| 100 | 35 | 43 | 3038 | 1730 |
| 150 | 31 | 38 | 3038 | 1730 |
| 200 | 28 | 35 | 3038 | 1730 |
| 250 | 26 | 31 | 3038 | 1730 |

840nm, 1.23V, 20msec

| Threshold (DN) | X-Extent (pixels) | Y-Extent (pixels) | Centroid (X) | Centroid (Y) |
|---|---|---|---|---|
| 80 | 34 | 41 | 3040 | 1730 |
| 100 | 32 | 39 | 3038 | 1730 |
| 150 | 28 | 34 | 3038 | 1730 |
| 200 | 25 | 31 | 3038 | 1730 |
| 250 | 23 | 28 | 3038 | 1731 |

840nm, 1.36V, 100usec

| Threshold (DN) | X-Extent (pixels) | Y-Extent (pixels) | Centroid (X) | Centroid (Y) |
|---|---|---|---|---|
| 80 | 32 | 38 | 3040 | 1730 |
| 100 | 29 | 36 | 3038 | 1730 |
| 150 | 25 | 31 | 3038 | 1730 |
| 200 | 22 | 27 | 3038 | 1730 |
| 250 | 19 | 23 | 3038 | 1731 |

CAMERA MONITOR USING CLOSE PROXIMITY PRECISION INJECTION OF LIGHT

SUMMARY

An imaging system for an aircraft is disclosed in accordance with one or more illustrative embodiments of the present disclosure. In one illustrative embodiment, the imaging system comprises one or more image sensors configured to image a surrounding environment of the aircraft. In another illustrative embodiment, the imaging system comprises a light source configured to emit light. In another illustrative embodiment, the imaging system comprises a mask including one or more prisms configured to direct the light, and one or more pinholes configured pass the light directed from the one or more prisms. In another illustrative embodiment, the imaging system comprises a controller communicatively coupled to the one or more image sensors. The controller includes one or more processors configured to execute program instructions causing the one or more processors to: receive an image of the surrounding environment of the aircraft from the one or more image sensors, wherein the image includes an artifact based on the light passed by the one or more pinholes; determine centroid data and extent data of the artifact in the image; and determine an orientation of the artifact in the image with respect to a calibration artifact using the centroid data and the extent data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

A conventional method of measuring the orientation (i.e., misalignment) of an image captured by an aircraft image sensor entails using intrinsic manufacturing flaws in the image sensor. Prior generations of image sensors are more prone to damage from cosmic rays due to relatively large pixels and less sophisticated manufacturing methods, which produce significant variability in pixel responsivities. In contrast, modern complementary metal oxide semiconductor (CMOS) technology is driving toward higher resolutions and more consistent manufacturing methods where the reliance on such intrinsic flaws or variability is not practical for measuring image orientation. Since it is not practical to use conventional orientation monitoring techniques that employ dead pixels or fixed pattern noise (FPN) in the image sensors, it may be desirable to employ techniques that do not rely on manufacturing flaws.

Embodiments of the present disclosure are directed to an imaging system for an aircraft employing a light source, prisms, and pinholes to produce an artifact in the images collected by the imaging system. The artifact may then be used to determine the orientation of the collected images. If a detected misalignment exceeds a threshold misalignment, the image may be removed from the video stream shown to the user (e.g., pilot) of the aircraft. The imaging system may be, for example, part of an enhanced vision system (EVS) substantially similar to the EVS-3000 or EVS-3600 developed by Rockwell Collins, Inc. (Cedar Rapids, Iowa).

Figure 1:
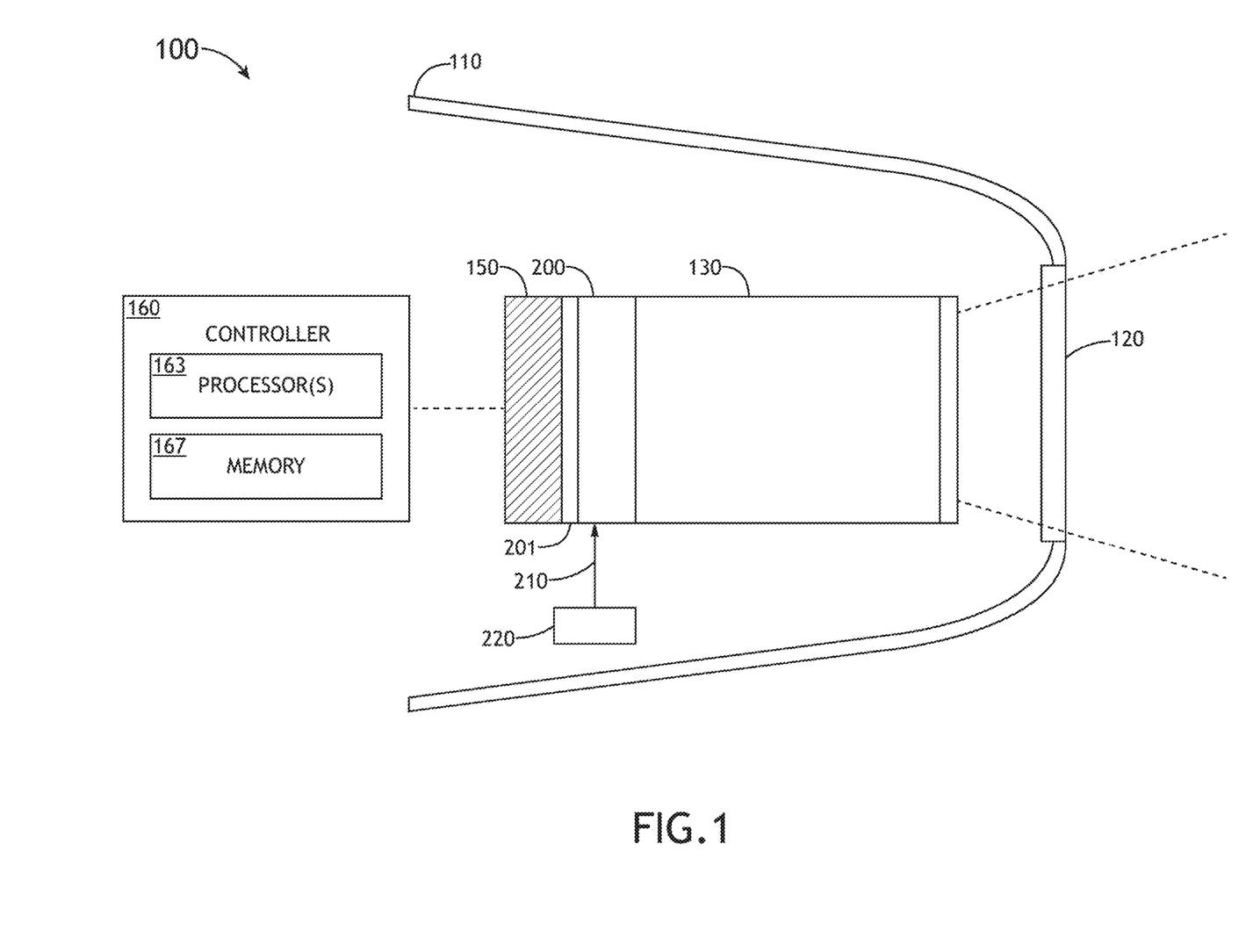
FIG. 1 is a diagram view of an imaging system including a light source and a mask, in accordance with one or more embodiments of the present disclosure.

FIG. 1 is a diagram view of an imaging system 100 for an aircraft, in accordance with one or more embodiments of the present disclosure. The imaging system 100 may be in a cavity in the body 110 of the aircraft and may include a window 120, a lens assembly 130, one or more image sensors 150, a housing 200, a mask 201, and a light source 220.

The window 120 may be transparent and may be adhered to the body 110 such that the cavity is sealed from the outside environment. The lens assembly 130 may include one or more lenses configured to direct light entering the cavity to the one or more image sensors 150. The one or more image sensors 150 may comprise a focal plane array (FPA) including an array of pixels (e.g., millions of pixels) and may be located at an image plane (i.e., field plane) of the imaging system 100 conjugate to an object plane in the surrounding environment. The one or more image sensors 150 may comprise a CMOS photodiode array, although the present disclosure is not limited thereto. For example, in some embodiments, the one or more image sensors 150 may comprise a charge-coupled device (CCD) photodiode array. The one or more image sensors 150 may comprise one or more monochrome or RGB cameras configured to image optical wavelengths, and/or one or more infrared (IR) cameras configured to image short-wave IR (SWIR) and long-wave IR (LWIR) wavelengths. In some embodiments, the aircraft may include multiple imaging systems 100 where each image sensor 150 is a different type of camera. For example, the aircraft may include an RGB sensor 150, an SWIR sensor 150, and an LWIR sensor 150. The images captured by each type of sensor 150 may be fused or combined for an EVS output (i.e., a multi-spectral fusion video stream viewable to a pilot of the aircraft).

In some embodiments, a controller 160 (e.g., computer or computing system) including one or more processors 163 and a memory 167 may be communicatively coupled to the one or more image sensors 150. Program instructions may be stored on the memory 167, that, when executed by the one or more processors 163, cause the one or more processors 163 to perform functions, procedures, algorithms, methods, etc. described in the present disclosure. For example, in some embodiments, the program instructions may cause the one or more processors 163 to receive an image of the surrounding environment of the aircraft from the one or more image sensors 150. The centroid data and the extent data of an artifact may then be extracted from the image and compared to a calibration artifact (i.e., a reference artifact indicating a correct orientation) to determine the orientation of the captured image.

The one or more processors 163 of the controller 160 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs). In this sense, the one or more processors 163 may include any device configured to execute algorithms and/or instructions (e.g., program instructions stored in memory). In one embodiment, the one or more processors 132 may be embodied in an embedded system of an aircraft EVS.

The memory medium 167 may include any storage medium known in the art suitable for storing program instructions executable by the associated one or more processors 163. For example, the memory medium 167 may include a non-transitory memory medium. By way of another example, the memory medium 167 may include, but is not limited to, a read-only memory (ROM), a random-access memory (RAM), a magnetic or optical memory device (e.g., disk), a magnetic tape, a solid-state drive and the like. It is further noted that memory medium 167 may be housed in a common controller housing with the one or more processors 163. In one embodiment, the memory medium 167 may be located remotely with respect to the physical location of the one or more processors 163 and controller 160. For instance, the one or more processors 163 of the controller 160 may access a remote memory (e.g., server), accessible through a network (e.g., internet, intranet and the like).

Figure 2:
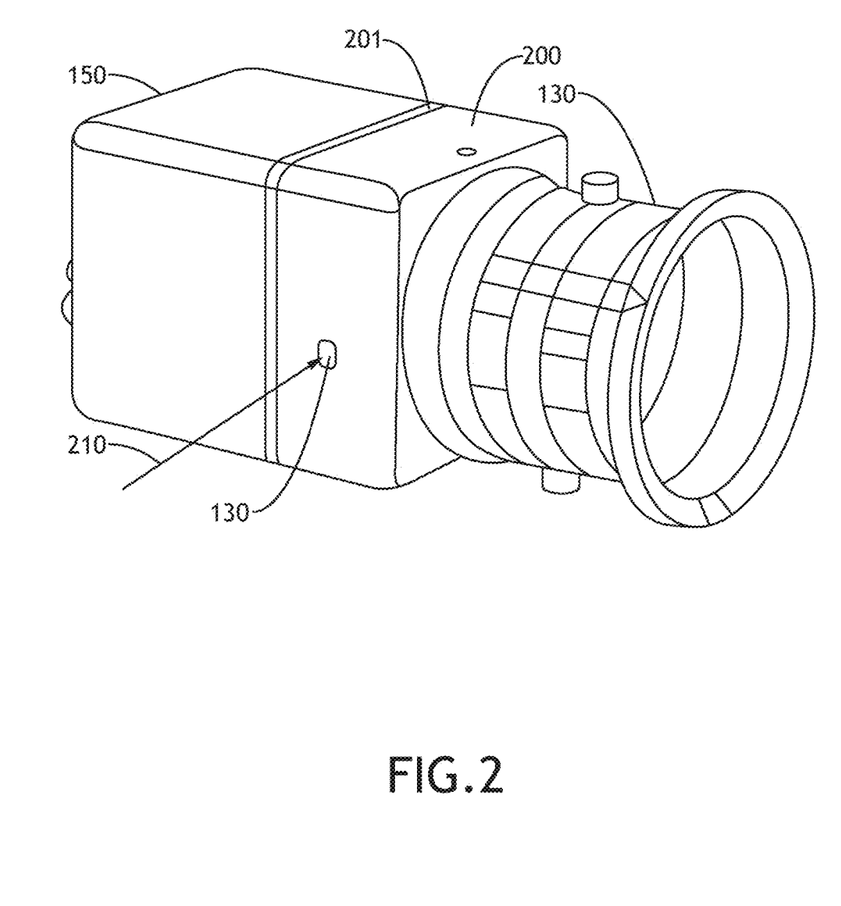
FIG. 2 is a perspective drawing illustrating the imaging system of FIG. 1, in accordance with one or more embodiments of the present disclosure.

The light source 220 may be a light emitting diode (LED) or a laser diode configured to emit light 210 (e.g., a laser beam) in a wavelength range of from about 400 nm to about 2000 nm, although the present disclosure is not limited thereto. In some embodiments, the light 210 may have a wavelength within the response of the one or more image sensors 150. As shown in FIG. 2, the light 210 may be passed by an aperture or hole 230 in the housing 200, and may then enter the mask 201. In some embodiments, the mask 201 comprises KOVAR™ (trademark of CRS Holdings, inc., Delaware), FerNiCo I, FerNiCo II, or another nickel-cobalt ferrous alloy, although the present disclosure is not limited thereto. The thermal expansion coefficients of Ni—Co—Fe alloys may closely match the thermal expansion coefficients of glass, enabling glass seals such that the seal does not fracture with temperature changes. For this reason, the mask 201 comprising the Ni—Co—Fe alloy may be adhered or affixed closely to a cover glass of the image sensor 150 to minimize stray light.

Figure 3:
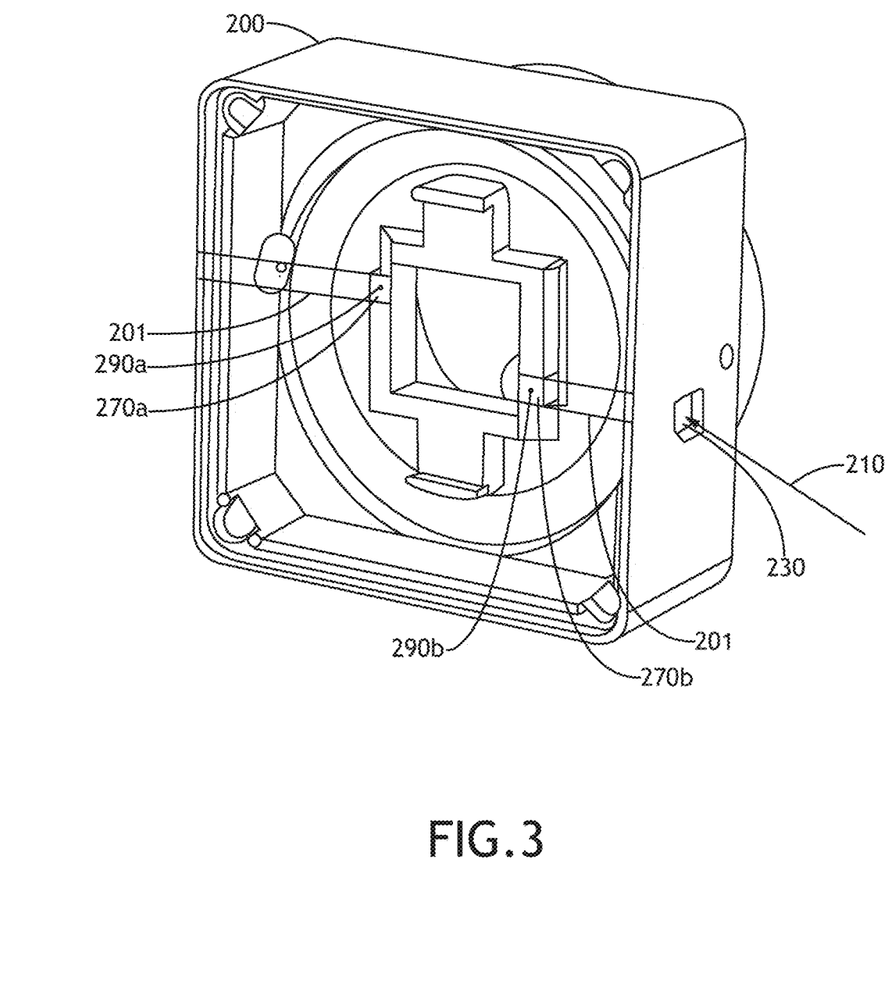
FIG. 3 is a perspective drawing illustrating the mask including two prisms, in accordance with one or more embodiments of the present disclosure.

As shown in FIG. 3, the light 210 may enter the mask 201 through the aperture or hole 230 and the housing 200. One or more prisms 270*a-b* may direct the light 210 to one or more pinholes 290*a-b* in the mask 201. The light 210 may pass through one or more pinholes 290a-b to create an artifact in images collected by the image sensor 150. The one or more prisms 270a-b may comprise plastic or glass and may be adhered or affixed to surfaces of the mask 201 and/or the housing 200. In some embodiments, the one or more prisms 270a-b may reflect the light 210 by about 90° so that the light 210 is incident on the focal-plane array of the image sensor 150 (e.g., at a normal angle of incidence).

Figure 4A:
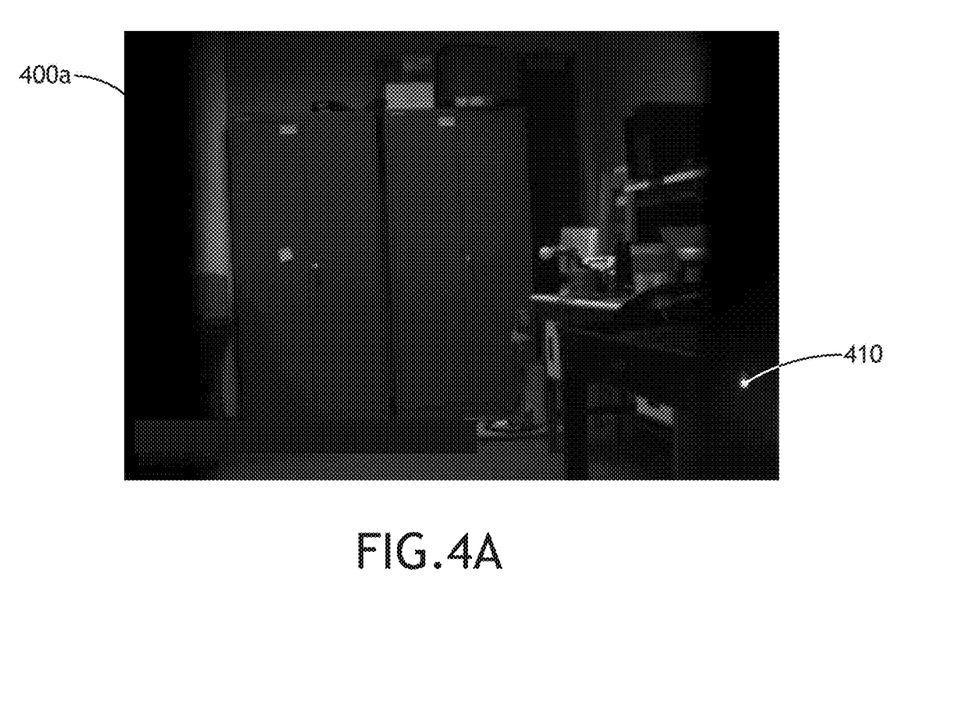
FIGS. 4A-4B are images showing artifacts on dark backgrounds, in accordance with one or more embodiments of the present disclosure.
Figure 4B:
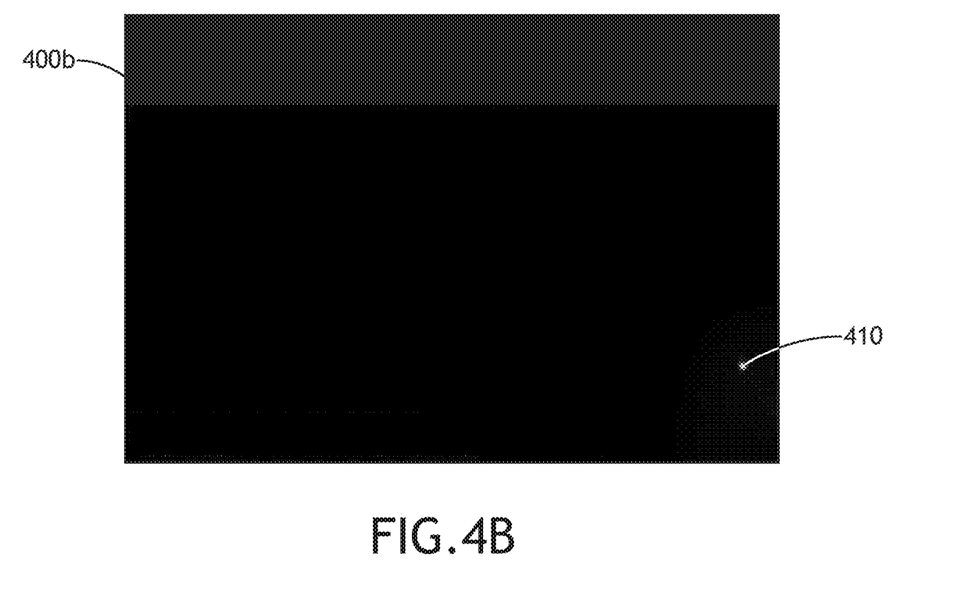

As shown in FIGS. 4A-4B, the artifact 410 may appear as a white dot imposed on a dark background (e.g., shadowed regions on the sides of the collected images 400a and 400b). The shadowed regions caused by the mask 201 may provide a high contrast area for the artifact 200. The image 400a was produced using a wavelength of 860 nm, an LED voltage of 1.20 V, and an exposure time of 20 milliseconds. The image 400b was produced using a wavelength of 860 nm, an LED voltage of 1.39 V, and an exposure time of 50 microseconds. The artifact 410 may be asymmetrical, or, in some embodiments, may have one or more axes of symmetry. In some embodiments, the artifact 410 may be shaped by the one or more pinholes 290a-b into a grating shape, a speckle pattern, a geometric shape, etc. In some embodiments, two or more artifacts 410 may appear in the collected image (e.g., at opposite corners), where each respective artifact 410 is caused by the light 210 passing through a respective pinhole 290a or 290b.

It may be advantageous to employ the artifact 410 imposed on a shadowed FPA region to determine the orientation of an image since the present imaging system 100 is versatile and robust compared to alternatives. For example, the present imaging system 100 may be employed in conditions of limited light such as instrument meteorological conditions (IMC) or night time. The present imaging system may also forego the requirement of an imaging processing algorithm to remove the artifact imposed on the image of the surroundings of the aircraft, for example, as described with respect to U.S. patent application Ser. No. 17/176,931 entitled "CAMERA CORE MONITOR USING GRADIENT FILTER," which is incorporated by reference herein in its entirety.

Figure 5A:
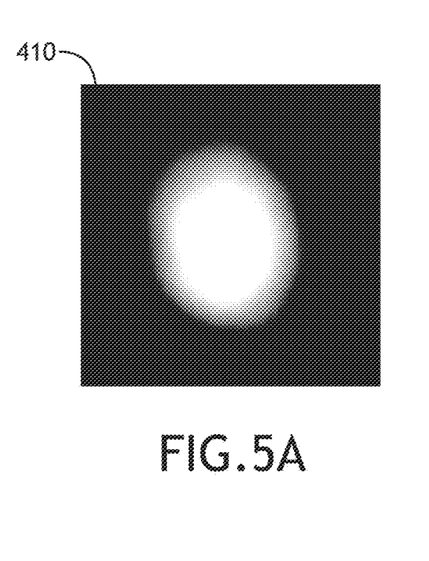
FIGS. 5A-5C are conceptual images illustrating an actual artifact, an ideal artifact, and a realistic artifact, in accordance with one or more embodiments of the present disclosure.
Figure 5B:
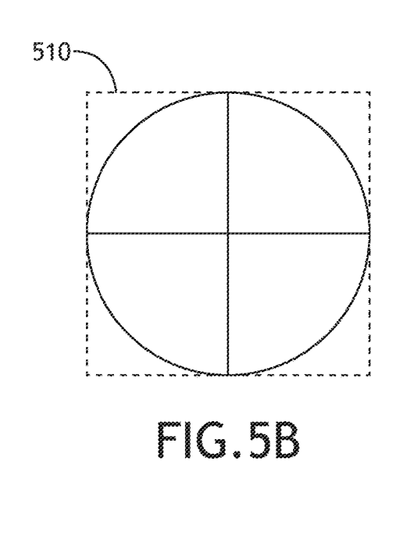
Figure 5C:
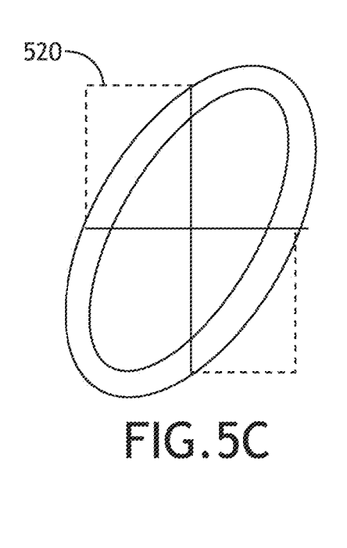

FIGS. 5A-5C are conceptual images respectively illustrating an actual artifact 410 captured by an image sensor 150, an idealized artifact 510, and a realistic artifact 520, in accordance with one or more embodiments of the present disclosure. As shown, the idealized artifact 510 may have a circular shape with a digital number (DN; i.e., pixel intensity) greater than 0 inside the artifact and equal to zero outside the artifact. However, as illustrated by the realistic artifact 520, it may be reasonable to assume that the artifact is tilted and comprises concentric rings of varying intensity (as seen by the actual artifact 410).

The extent and centroid of the artifact may be estimated using DN threshold values. For example, to calculate the extent data, the artifact may be divided into four quadrants, and the edges of the artifact may be defined using a DN threshold (for example, the edges defining the intersection of pixels where DN=0 and pixels where DN>0). To calculate the centroid data, the arithmetic mean of the DN values of all of the pixels within the artifact edges may be calculated, and the centroid pixel may be defined at [x, y] coordinates (e.g., horizontal and vertical coordinates).

Figure 6A:
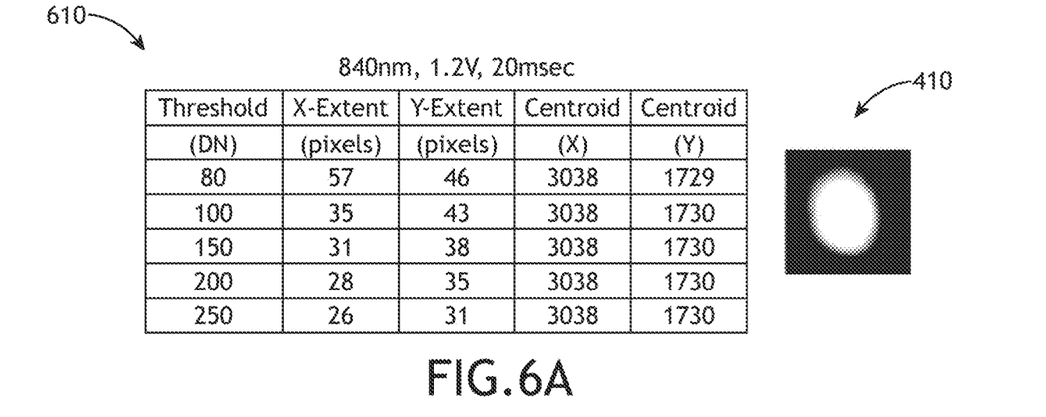
FIGS. 6A-6C are tables showing the results of varying wavelength, voltage, and exposure time when producing an artifact, in accordance with one or more embodiments of the present disclosure.
Figure 6B:
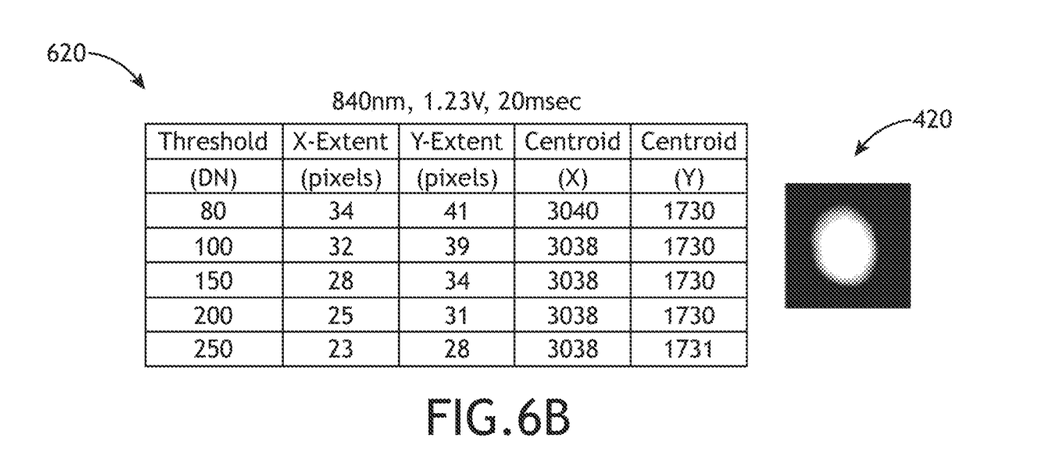
Figure 6C:
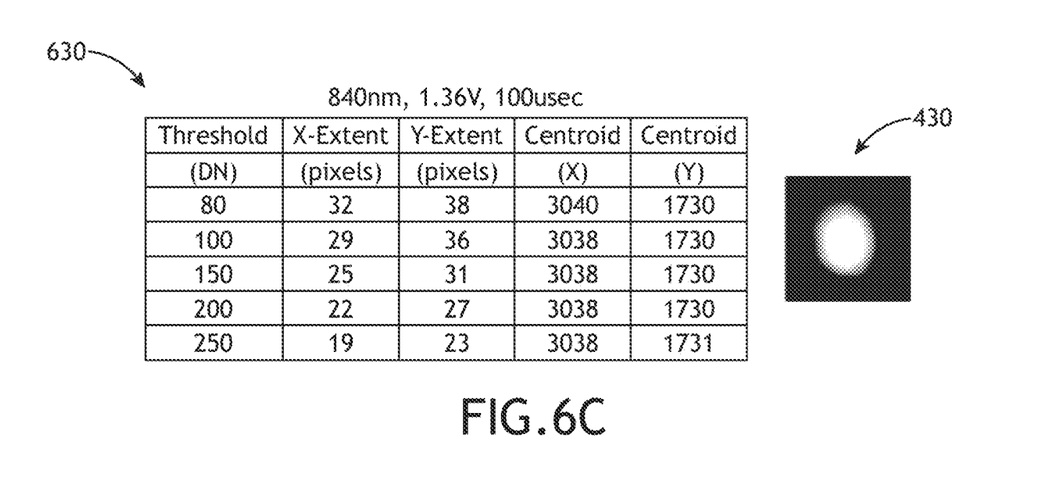

FIGS. 6A-6C are tables 610, 620 and 630 showing the results of experiments for a given wavelength of light within the sensor passband, while varying the voltage of the light source and/or and the exposure time, in accordance with one or more embodiments of the present disclosure. For each experiment, the DN threshold defining the edges of the artifact 410 was varied from 80 up to 250. The X-extent, Y-extent, X-centroid coordinate, and Y-centroid coordinate were calculated based on each DN threshold.

For the experiment represented by table 610, the wavelength of light was configured to be 840 nm, the voltage of the light source was configured to be 1.2 V, and the exposure time was configured to be 20 milliseconds. For the experiment represented by table 620, the wavelength of light was configured to be 840 nm, the voltage of the light source was configured to be 1.23 V, and the exposure time was configured to be 5 milliseconds. For the experiment represented by table 630, the wavelength of light was configured to be 840 nm, the voltage of the light source was configured to be 1.36 V, and the exposure time was configured to be 100 microseconds. As is shown, the centroid pixels are shifted by one or two pixels for some steps of DN threshold. This small shift indicates the relative stability of the estimated centroid, and provides insight into the range of pixel shift that may be used as a detection threshold to declare a misaligned image. Predictably, the extent decreases as the DN threshold increases.

Figure 7A:
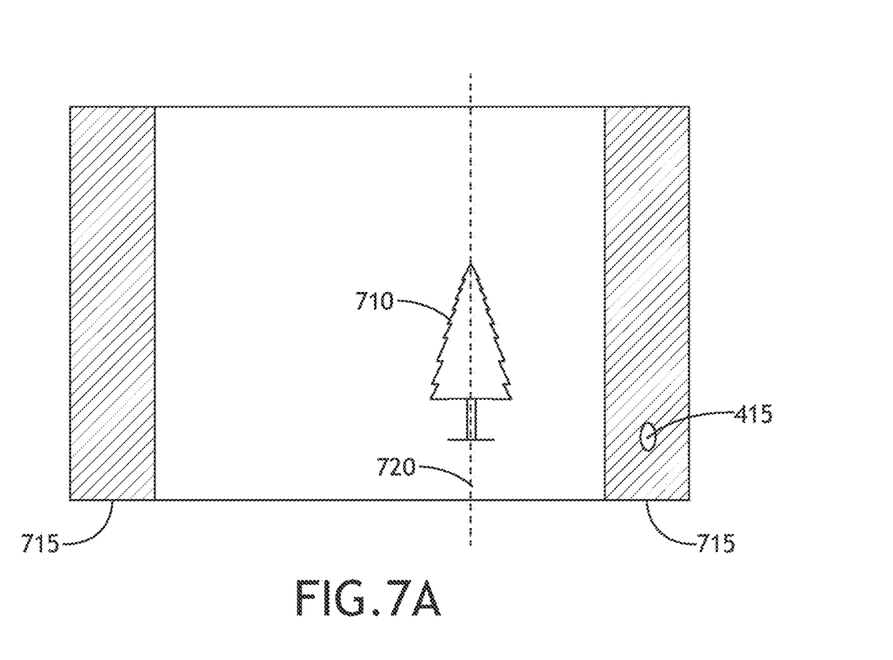
FIGS. 7A-7B are conceptual drawings illustrating the rotation of an artifact with respect to a calibration artifact, in accordance with one or more embodiments of the present disclosure.
Figure 7B:
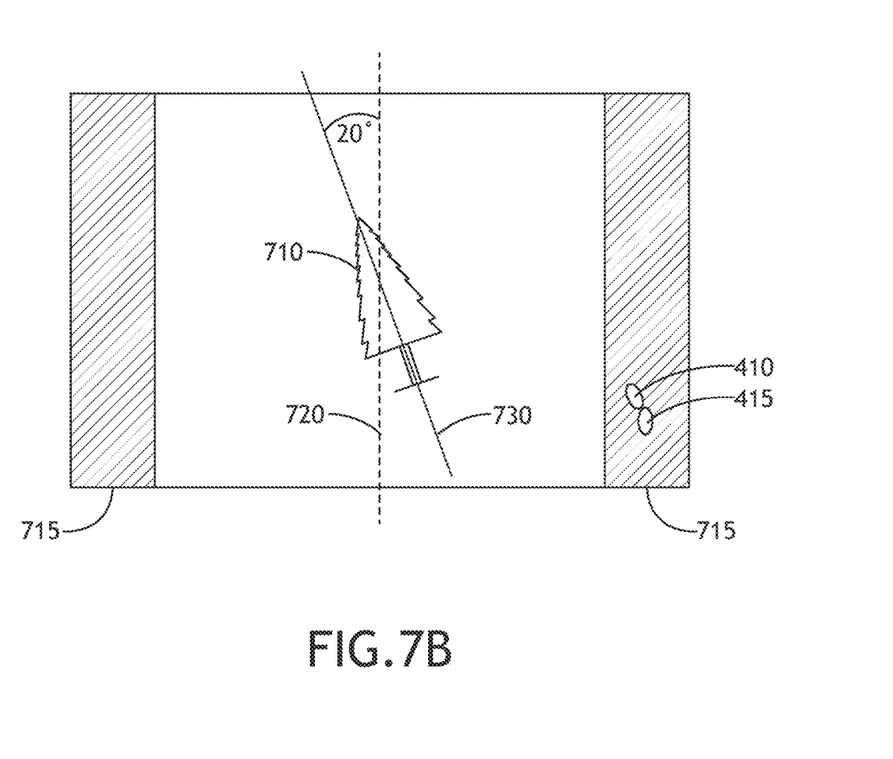

FIGS. 7A-7B are conceptual drawings illustrating the rotation of the artifact 410 with respect to a calibration artifact 415, in accordance with one or more embodiments of the present disclosure.

FIG. 7A illustrates an image of an object 710, and a calibration artifact 415 imposed on a dark background 715 (e.g., masked areas 715). The object 710 appears with a correct orientation 720, and the calibration artifact 415 that appears in the image of FIG. 7A may be used as a reference artifact.

FIG. 7B illustrates an image of the object 710 having an orientation 730 that is misaligned by rotation from the correct orientation 720. The extent data and the centroid data of the artifact 410 may be determined from the image of FIG. 7B, and may be compared with the calibration artifact 415 to determine the rotational misalignment (e.g., about 20°). Responsive to the rotational misalignment being greater than a threshold rotational misalignment within a selected tolerance (e.g., ±0.05°), the image of FIG. 7B may be removed from the EVS video stream (e.g., removed from the stream presented on a display to a pilot of the aircraft).

Figure 8A:
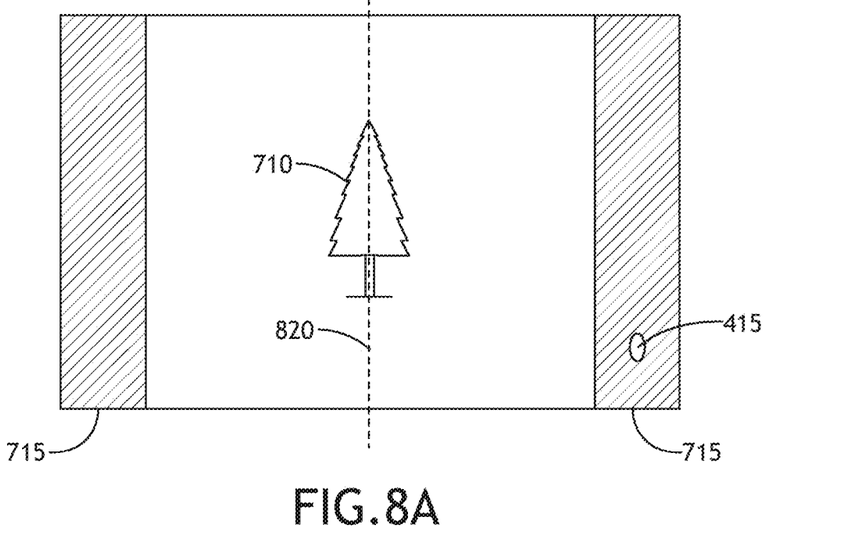
FIGS. 8A-8B are conceptual drawings illustrating the translation of an artifact with respect to a calibration artifact, in accordance with one or more embodiments of the present disclosure.
Figure 8B:
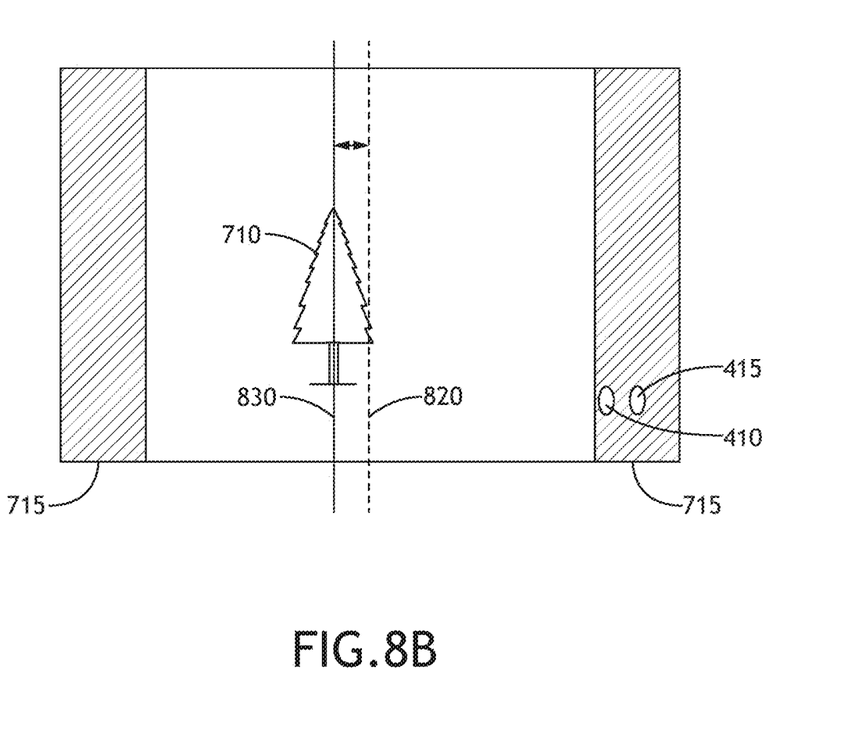

FIGS. 8A-8B are conceptual drawings illustrating the translation of the artifact 410 with respect to a calibration artifact 415, in accordance with one or more embodiments of the present disclosure.

FIG. 8A illustrates an image of an object 710, and a calibration artifact 415 imposed on a dark background 715 (e.g., masked areas 715). The object 710 appears with a correct orientation 820, and the calibration artifact 415 that appears in the image of FIG. 8A may be used as a reference artifact.

FIG. 8B illustrates an image of the object 710 having an orientation 830 that is misaligned by translation from the correct orientation 820. The extent data and the centroid data of the artifact 410 may be determined from the image of FIG. 8B, and may be compared with the calibration artifact 415 to determine the translational misalignment. Responsive to the translational misalignment being greater than a threshold translational misalignment within a selected tolerance (e.g., ±10 pixels), the image of FIG. 8B may be removed from the EVS video stream (e.g., removed from the stream presented on a display to a pilot of the aircraft).

Figure 9A:
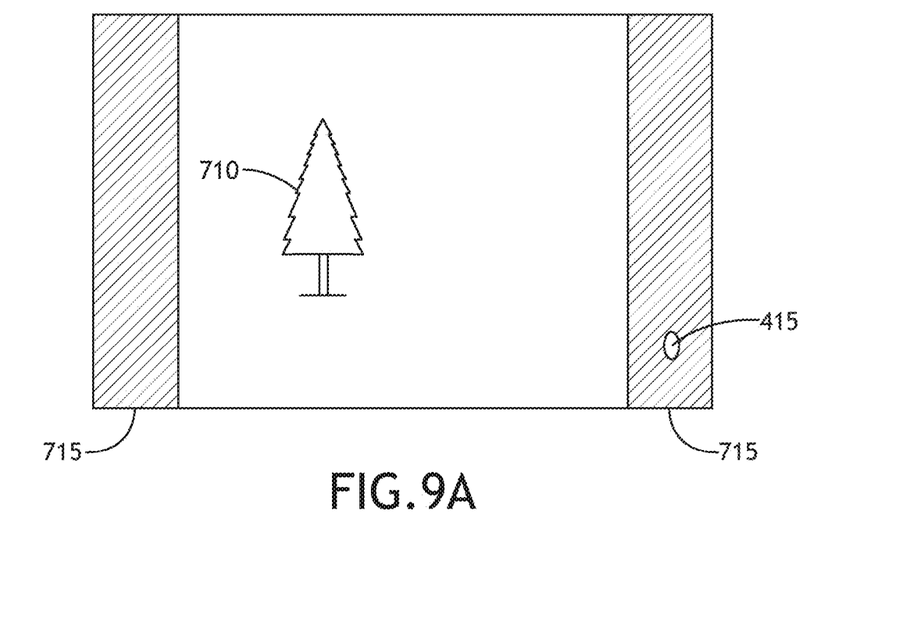
FIGS. 9A-9B are conceptual drawings illustrating the reflection of an artifact with respect to a calibration artifact, in accordance with one or more embodiments of the present disclosure.
Figure 9B:
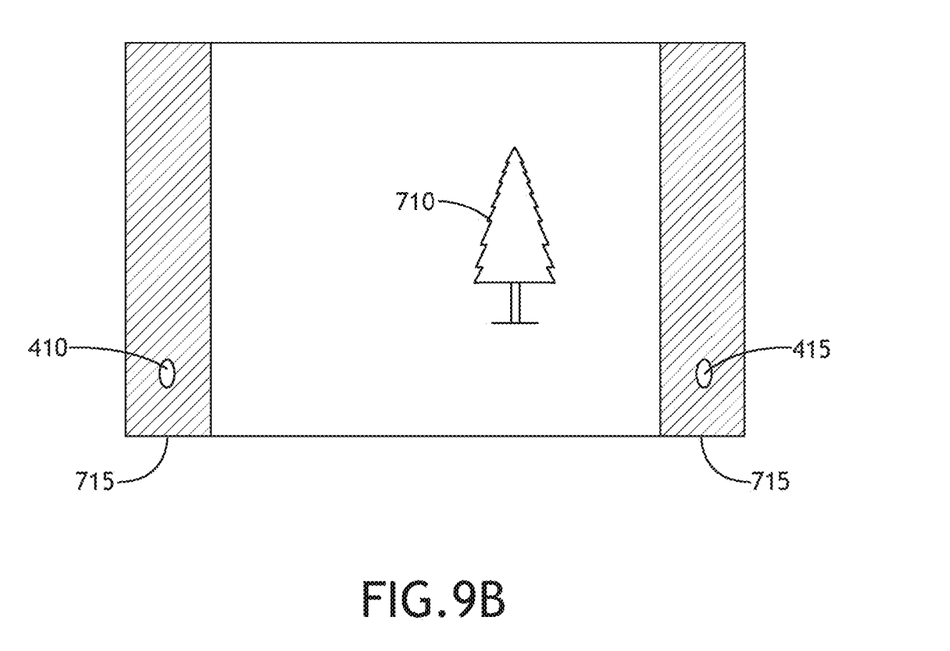

FIGS. 9A-9B are conceptual drawings illustrating the reflection of the artifact 410 with respect to a calibration artifact 415, in accordance with one or more embodiments of the present disclosure.

FIG. 9A illustrates an image of an object 710 and the calibration artifact 415 imposed on a dark background 715 (e.g., masked areas 715). The object 710 appears with a correct orientation, and the calibration artifact 415 that appears in the image of FIG. 9A may be used as a reference artifact.

FIG. 9B illustrates an image of the object 710 having an orientation that is misaligned by reflection (mirror-symmetry) from the correct orientation. The extent data and the centroid data of the artifact 410 may be determined from the image of FIG. 9B, and may be compared with the calibration artifact 415 to determine the reflection misalignment. Responsive to a reflection misalignment being measured, the image of FIG. 9B may be removed from the EVS video stream (e.g., removed from the stream presented on a display to a pilot of the aircraft).

Figure 10:
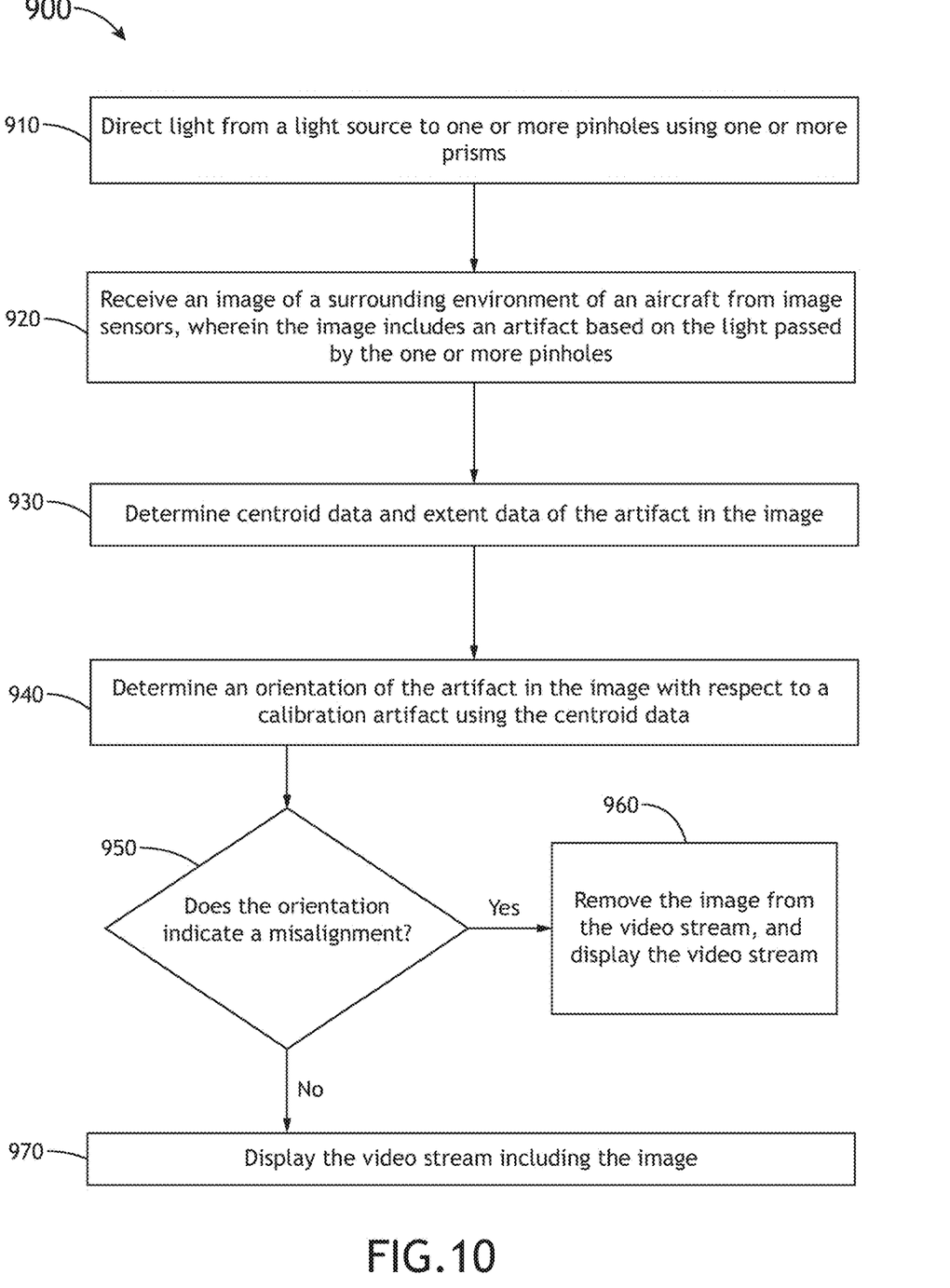
FIG. 10 is a flowchart illustrating a method of determining an orientation of an image, in accordance with one or more embodiments of the present disclosure.

FIG. 10 is a flowchart 900 illustrating a method of determining the orientation of an image, in accordance with one or more embodiments of the present disclosure.

At step 910, light may be directed from a light source to one or more pinholes within one or more masked regions using one or more prisms.

At step 920, an image of the surrounding environment of the aircraft may be received (e.g., by the controller 160) from one or more image sensors (e.g., image sensors 150). The image may include artifact(s) within one or more masked regions based on the light passed by one or more pinholes.

At step 930, the centroid data and the extent data of the artifact(s) may be determined.

At step 940, the centroid data may be compared to calibration artifact(s) (i.e., the centroid of a reference artifact indicating a correct orientation) to determine the orientation of the artifact(s) and the captured image. The comparison may occur every n frames (for example, every three frames).

At step 950, responsive to the centroid position of the artifact(s) indicating a misalignment (e.g., a rotational, translational, or reflection misalignment within a selected tolerance), the method may proceed to step 960, and responsive to the orientation of the artifact(s) indicating no misalignment (e.g., a correct alignment), the method may proceed to step 970.

At step 960, responsive to a misalignment being detected in the image, the image may be removed from the video stream (e.g., EVS video stream) presented on a display to a user of the aircraft. Alternatively, at step 970, responsive to no misalignment being detected in the image, the image may be left in the video stream.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An imaging system for an aircraft, comprising:
    one or more image sensors configured to image a surrounding environment of the aircraft;
    a light source configured to emit light;
    a mask including one or more prisms configured to direct the light, and one or more pinholes configured pass the light directed from the one or more prisms;
    a controller communicatively coupled to the one or more image sensors, wherein the controller includes one or more processors configured to execute program instructions causing the one or more processors to:
        receive an image of the surrounding environment of the aircraft from the one or more image sensors, wherein the image includes an artifact based on the light passed by the one or more pinholes;
        determine extent data and centroid data of the artifact in the image; and
        determine an orientation of the artifact in the image with respect to a calibration artifact using the centroid data.

2. The imaging system of claim 1, wherein the artifact appears on shadowed regions in the image to provide a high contrast between the artifact and the image.

3. The imaging system of claim 1, wherein the artifact is asymmetrical.

4. The imaging system of claim 1, wherein the artifact is symmetrical.

5. The imaging system of claim 1, wherein the light has a wavelength of from 400 nm to 850 nm.

6. The imaging system of claim 1, wherein the image is captured by the one or more image sensors with an exposure time of from 10 microseconds to 100 milliseconds.

7. The imaging system of claim 1, wherein the light source is a light-emitting diode (LED).

8. The imaging system of claim 1, wherein the light source is a laser diode.

9. The imaging system of claim 1, wherein determining the orientation of the artifact in the image with respect to the calibration artifact comprises:
    comparing an axis of symmetry of the artifact in the image with an axis of symmetry of the calibration artifact.

10. The imaging system of claim 1, wherein the orientation of the artifact indicates a rotation of the image with respect to the calibration artifact.

11. The imaging system of claim 1, wherein the orientation of the artifact indicates a translation of the image with respect to the calibration artifact.

12. The imaging system of claim 1, wherein the determined orientation of the image with respect to the calibration artifact indicates a reflection of the image with respect to the calibration artifact.

13. The imaging system of claim 1, wherein the one or more image sensors comprise a complementary metal oxide semiconductor (CMOS) photodiode array.

14. The imaging system of claim 1, wherein, responsive to the orientation of the artifact indicating a misalignment, the one or more processors are further configured to execute program instructions causing the one or more processors to:
    remove the image from a video stream configured to be presented on a display to a user of the aircraft.

* * * * *